United States Patent
Blossfeld et al.

(10) Patent No.: US 6,227,038 B1
(45) Date of Patent: May 8, 2001

(54) RADIOTRACER METHOD FOR MEASURING LEAKAGE OF ENGINE COOLANT

(75) Inventors: Daniel Hicks Blossfeld, Novi; Eric West Schneider, Shelby Township, Macomb County; Richard William Gushman, Rochester Hills, all of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/289,920

(22) Filed: Apr. 12, 1999

(51) Int. Cl.[7] ............................. G01M 3/04; C02F 1/00; G01T 1/161
(52) U.S. Cl. ......................... 73/49.7; 250/303; 210/739
(58) Field of Search ................. 73/40, 40.7, 46, 73/49.07; 250/303; 210/739

(56) References Cited

U.S. PATENT DOCUMENTS 3,745,338 * 7/1973 Joyce ................................ 250/303
4,746,795 * 5/1988 Stewart et al. ..................... 250/303
5,968,371 * 10/1999 Verdegan et al. .................. 210/739

FOREIGN PATENT DOCUMENTS

2217684 * 11/1974 (FR) ........................... F02B/77/08

* cited by examiner

Primary Examiner—Hezron Williams
Assistant Examiner—Jay L. Politzer
(74) Attorney, Agent, or Firm—George A. Grove

(57) ABSTRACT

Leakage of engine coolant into the engine lubricating oil can be detected to high sensitivity levels by dissolving a glycol-soluble salt of $^{86}$Rb as a tracer in the coolant and detecting the beta or gamma ray radiation from the tracer containing coolant in a suspected leakage path or in the lubricating oil. A useful application of this detection method is in the region of the head gasket (i.e., between the cylinder block and cylinder head) of a liquid-cooled internal combustion engine.

8 Claims, 4 Drawing Sheets

RADIOTRACER METHOD FOR MEASURING LEAKAGE OF ENGINE COOLANT

TECHNICAL FIELD

This invention pertains to a method for detecting the leakage of engine coolant into the engine oil. The method is, for example, particularly useful in detecting coolant leaks and leak paths in the head gasket area of an internal combustion piston engine. More specifically, this invention pertains to the use of a radiotracer in such a method.

BACKGROUND OF THE INVENTION

It is well known that separate, but sometimes closely spaced, quantities of coolant and lubrication oil are employed in the operation of liquid-cooled, internal combustion piston engines. In the construction of such engines, an engine cylinder block is employed in a closely fitting, sealing relationship with a cylinder head block. Depending upon its configuration of cylinders (e.g., "in line" or "V"), the cylinder block is formed with one or two upper flat deck surfaces against which an overlying cylinder head(s) is bolted. Since both the engine block and head contain oil and coolant passages, a head gasket is interposed between them as a seal to keep the liquids separated as well as seal the cylinder bores.

The engine lubricating oil is a mixture of hydrophobic organic compounds with stabilizing additives, and the coolant is a homogeneous mixture of ethylene or propylene glycol with water and dissolved stabilizing and corrosion-inhibiting additives. The coolant pressure may at times exceed the oil pressure and may leak across the head gasket interfaces into the oil despite the presence of the head gasket.

Proper sealing between the coolant and oiling systems in an engine is of paramount importance to engine durability. Small amounts of coolant contamination in the oil lead to rust and to degradation of oil by removal and decomposition of oil additives. A large amount of coolant contamination can lead to bearing failure due to a loss of bearing load capacity. Significant efforts have been made to design head gaskets that provide durable sealing of the engine cooling system.

Engineers involved in the design or modification of engines need to have a method, other than trial and error, of determining the leakage path of the coolant in order to specify gasket design, bolt location, torque requirements or the like. Techniques that are currently available to measure small rates of coolant leakage are inadequate. Measurement of glycol in oil is only semi-quantitative, and coolant may be lost from the oil by degradation, evaporation or inclusion in engine deposits. Quantitative determination of coolant leakage is possible for coolants that employ potassium salts by measuring the potassium levels in the oil. However, sensitivity is limited because of the relatively small amount of potassium in the coolant. Visual observations can be used inside an engine to determine whether coolant is leaking across a sealed interface. However, the accumulation point may be a distance from the actual leak path, and a fairly high leakage rate is required before it is observable.

In order to provide a means for specifically determining the leakage path across gasket materials, it was decided to determine the feasibility of using radiotracers to detect and locate coolant leakage. An object was to measure precisely where the gasket interface was being breached. In addition, it was a more general object to develop the capability to measure small amounts of coolant contamination in oil.

SUMMARY OF THE INVENTION

In accordance with this invention, a radiotracer method has been developed to measure the presence of small amounts of coolant contamination in oil. Further, a radiotracer method has been developed to determine the pathway(s) of coolant leakage through head gaskets into engine oil.

A radiotracer species was found which would: (i) remain suspended in the coolant during engine operation, (ii) be easily imaged on photographic film, and (iii) be easily detected in engine oil. Results of tests of an engine with known coolant leakage show that the technique can provide images of the leakage path through head gaskets. Also, quantitative values of coolant contamination in oil were obtained with a detection sensitivity better than 50 ppm at 95% confidence.

Several candidate radiotracers were evaluated for their capability to remain suspended in the coolant during engine operation, be easily imaged on photographic film, and be detected in samples of engine oil. The radiotracer selected for engine studies, $^{86}Rb$, was found to perform satisfactorily in each of these areas. For example, rubidium chloride containing a suitable amount of $^{86}Rb$ dissolves in water-glycol coolant and because of its radioactivity is detectable both in bulk oil and coolant and with x-ray film laid against a gasket having a suspected leak path.

Results of engine tests such as those described below showed that the $^{86}Rb$ tracer is capable of providing quantitative detection of coolant in the oil with a sensitivity better than ±50 ppm at 95% confidence. Images of the distribution of the radioactive coolant in head gaskets were obtained to determine the pathways of coolant leakage into the oil.

Thus, this invention provides a technique to image the pathways of coolant leakage across head gaskets and to provide for the quantitative determination of coolant contamination in lubricating oil. This technique can be used to determine the mechanism of the sealing failures and to evaluate the effectiveness of engineering modifications.

Other objects and advantages of this invention will become more apparent from a detailed description of an embodiment thereof. In the description, reference will be made to the drawings which are as follows.

DESCRIPTION OF A PREFERRED EMBODIMENT

Figure 1:
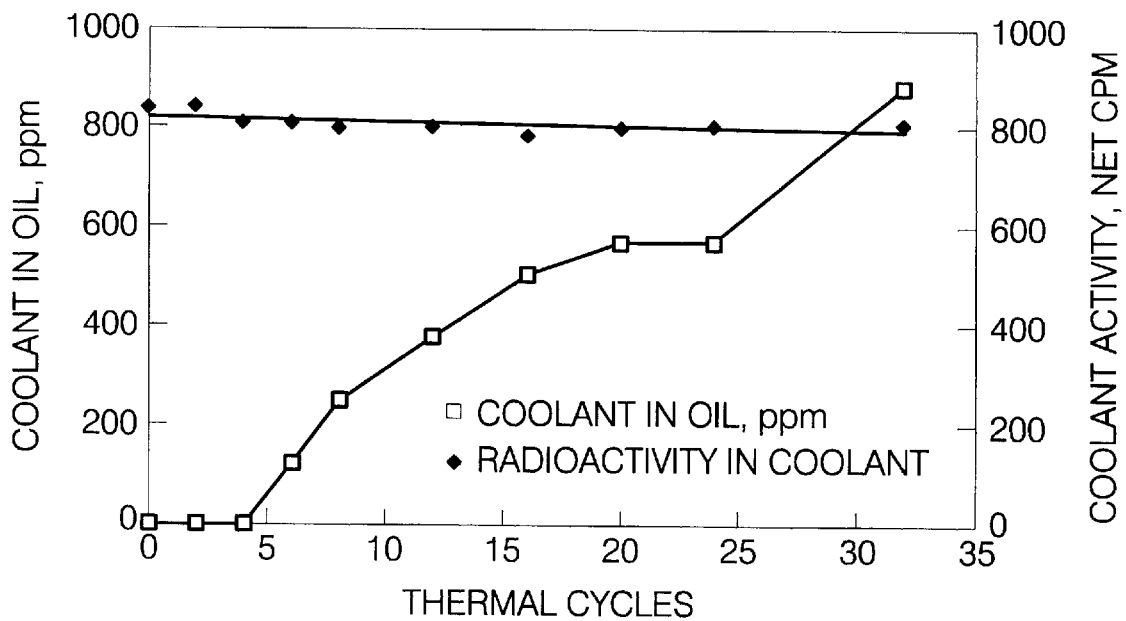
FIG. 1 is a graph of coolant contamination in oil as a function of engine thermal cycle number in Test A. Coolant contamination was determined from radiotracer levels in the oil. Also shown for reference is the radioactivity content in the coolant shown as net counts per minute during the same operating period.

Feasibility studies were conducted to determine whether a suitable radioactive species could be found to trace engine coolant through gasket materials and into engine oil. It was determined the necessary requirements for such a tracer are:

1. The tracer species must be readily soluble in engine coolant and must remain suspended in the coolant during engine operation (i.e., not be susceptible to deposition on hot metal surfaces).

2. The radioactivity must be able to be measured with high sensitivity in samples of engine coolant and engine oil.

3. The radioactive material must provide good imaging capability on photographic film at low concentrations.

4. The radiotracer must have a sufficiently long half-life to perform engine studies. (Ideally, the half-life of the species should also be short enough that the fluids and gasket materials can be held for decay rather than require disposal as radioactive waste.)

Feasibility studies were conducted with two radioactive species ($^{141}$Ce and $^{86}$Rb) identified from their nuclear decay properties as candidates for this application. Both species were purchased as dissolved metal chloride salts in 0.5M HCl. Each tracer provided good measurement and imaging capabilities, but the $^{141}$Ce concentration depleted rapidly inside the engine cooling system. The cerium was apparently absorbed on the extensive surfaces of the various coolant passages through which it flowed. However, the $^{86}$Rb tracer provided adequate performance for all requirements and was selected to be used for the engine coolant leakage studies. The rubidium ion is a preferred tracer because it is chemically similar to the potassium ion, which is a component in the coolant at a concentration of about 0.5% and remains in the coolant after prolonged usage.

Rubidium-86 decays by high-energy β-emission ($E_{max}$ of 1.775 MeV) which provides for good imaging on photographic film. It also emits a 1.077 MeV γ ray with 8.8% probability per decay, which can be used for its detection in bulk coolant and oil samples. With a half-life of 18.6 days, this species provides approximately one month of useful engine testing, and the $^{86}$Rb in the coolant will decay sufficiently to permit disposal of the coolant without regard to radioactivity after approximately six months.

Engine Coolant Tracer Studies

A prototype V8 gasoline engine was selected for evaluation of this $^{86}$Rb tracer method. The engine had been subjected to an aggressive coolant thermal test cycle for 1400 10-minute cycles and had experienced coolant leaks. The engine had been run on a test stand with a coolant heat exchanger that could quickly simulate coolant temperature extremes. The heads and head gaskets had been changed and an additional 1200 cycles accumulated. At the start of the radiotracer tests, visual observations showed no head gasket leakage, and there was no evidence of coolant in the oil pan. However, tests for glycol in the oil [GLY-TEK Test for ethylene glycol, Nelco Company, 1047 McNight Road South, St. Paul, Minn. 55119] consistently reported coolant contamination in the 50–200 ppm range. The engine had been assembled with commercial head gaskets having graphite composite only on the block-side of the gasket. In other words, the gasket, about 1.5 mm thick, was formed of a steel sheet with holes cut for cylinders, bolts and coolant passages. A compressible, porous graphite composite was applied to one side (cylinder block side) and thin plastic sheets covered both the graphite and bare steel sides.

After validating engine operation, approximately 2.4 mCi of the $^{86}$Rb radiotracer (as RbCl in 0.5M HCl) was added to 26.5-L of coolant (60% Texaco Long Life Coolant C510; 40% water) in the engine and heat exchanger. The total quantity of rubidium added to the coolant was six milligrams. This represented about 230 parts per billion Rb in the coolant and a K/Rb ratio of 20,000:1. The ratio of nonradioactive to radioactive Rb atoms was about 50,000:1.

The engine was then operated using a modified thermal cycle test schedule. Each test schedule consisted of five minutes of operation at 3750 r/min and 50 kPa manifold absolute pressure (MAP) followed by five minutes at 750 r/min and closed throttle. This cycle was designed to provide the maximum change in coolant temperature within the facility restraints of the dynamometer test cell (240 hp maximum power and engine cooling by tap water through a heat exchanger). During each cycle, the engine coolant fluctuated between a minimum of 46° C. and a maximum of 112° C.

The first engine test (Test A) during which radiotracer analyses were made consisted of 32 10-min modified thermal cycles. Samples of the engine coolant and oil were obtained after every two or four cycles. After 32 cycles, the radioactive coolant was removed from the engine, and the engine cooling system was flushed with water. The engine was disassembled and the head gaskets removed. Each gasket was carefully removed from the engine to minimize the amount of graphite composite adhering to the block. The gaskets were rinsed with water.

For Test B, the engine was reassembled with an original (graphite on one side) gasket on the left cylinder bank and an improved gasket on the right cylinder bank. The improved gasket had composite graphite on both sides of the steel substrate with plastic sheets covering the graphite layers. The engine was operated for 72 modified cycles without the radiotracer in the coolant. Then, approximately 2 mCi of the $^{86}$Rb tracer was added, and 264 additional modified cycles accumulated. An additional 6 mCi of $^{86}$Rb was then added and the engine run for 24 thermal cycles. Oil and coolant samples were obtained after every 12 cycles of Test B. At the conclusion of the total 360 thermal cycles, the coolant was removed from the engine, the cooling system flushed, and the head gaskets removed.

Analysis of Coolant, Oil and Head Gaskets for Radioactivity

Coolant samples were analyzed by dilution of a 1-mL sample into 20 mL of water and counting in a Packard Minaxi 5530 automated γ-ray analyzer which incorporated a shielded 76×76-mm NaI(Tl) detector. The counting window was selected to span the 1.077-MeV peak of $^{86}$Rb. Results were corrected for decay and background. Oil samples of 20-mL volume were counted without dilution using the same analyzer. Samples from Test A were counted for 30 minutes and samples from Test B were counted for 60 minutes.

To obtain information on absolute quantities of radioactive material in the engine cooling system, selected coolant samples were also counted at a 5-cm distance from a high-purity Ge(Li) detector with a detection efficiency determined by certified standards.

The gaskets from both engine tests were rinsed in a water bath for 10 minutes to remove any surface contamination of residual coolant that contacted the gasket surface during head removal. Thus, only absorbed $^{86}$Rb tracer material remained on the gaskets. Autoradiograms of both sides of both gaskets were obtained using Kodak Bio Max film. Exposure times were 96 hours for Test A and 66 hours for Test B.

Three sheets of 8×10-inch film were required to completely cover each gasket surface. After developing, each film was converted to a computer image by a digital scanner (Hewlett Packard ScanJet IIc). Individual scans were combined into a composite image (typically 3600×1200×256 pixels) and film-edge artifacts eliminated using image analysis software (Paint Shop Pro, v. 4.14, Jasc, Inc.).

Results of oil and coolant radioactivity measurements taken during Test A are presented in FIG. 1. Results confirm that the radiotracer concentration in the coolant remains relatively constant over the entire test (see the darkened diamond data points ♦ recording gamma ray counts per minute corrected for background and decay). Radioactivity in the oil begins to appear after four cycles and accumulates at a linear rate (see the open square data points □). The calculation of part-per-million contamination is made under the assumption that all the radiotracer remains suspended in the oil. The detection sensitivity obtained in this first study is better than 100 ppm coolant in oil at 95% confidence.

Figure 2:
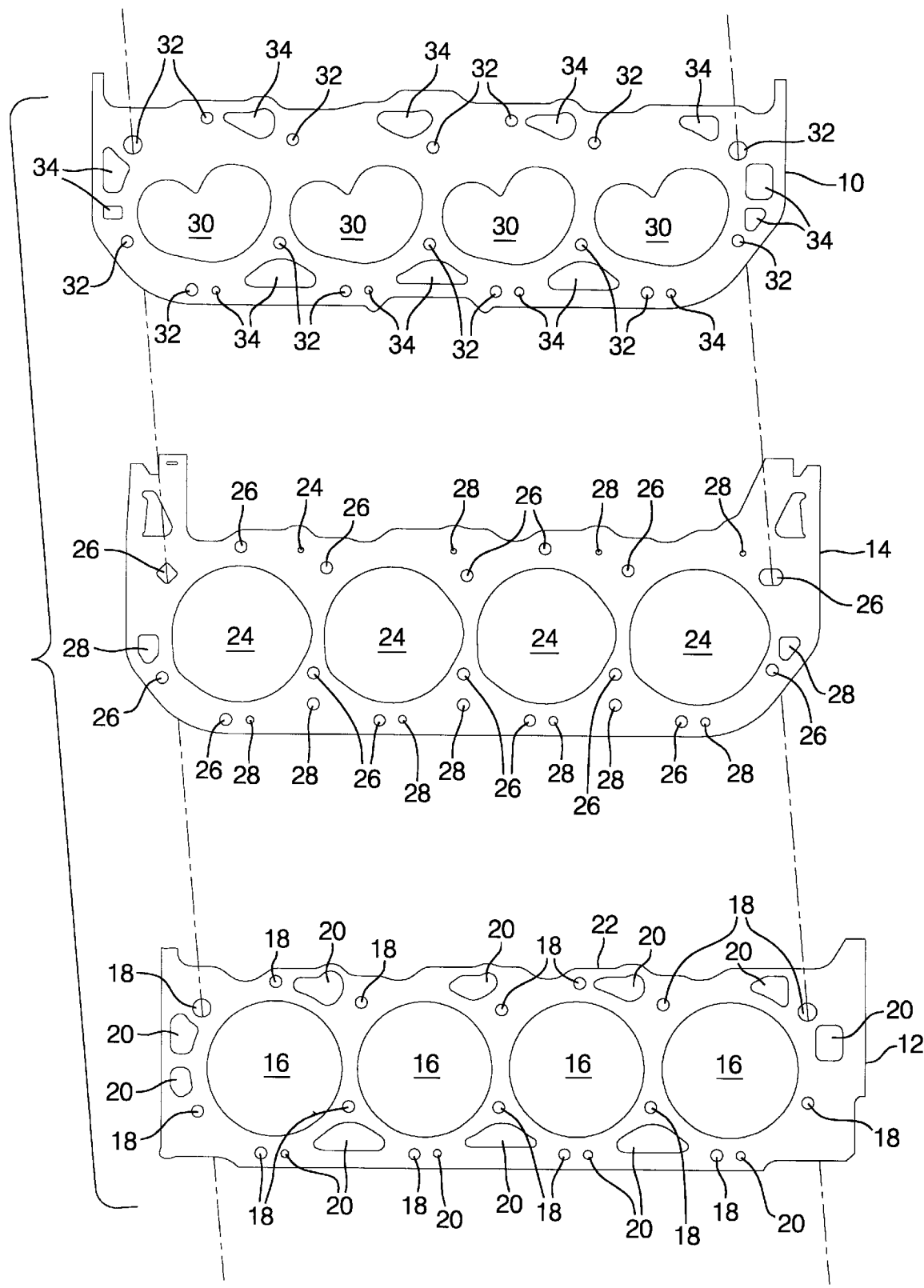
FIG. 2 comprises line drawings of the left cylinder bank head, the underlying cylinder block and gasket.

FIG. 2 shows line drawings of the left-bank cylinder head 10 (as viewed from the driver seat), cylinder block 12 and gasket 14. These drawings are shown in a generally exploded or overlying view so as to be useful when interpreting the patterns (see FIGS. 3 and 4) of radioactivity in autoradiograms of the gaskets.

The line view of the block 12 is like a plan view of the deck surface of the "V" block intended to be enclosed with the left bank cylinder head. The cylinder block deck is portrayed as containing four cylinders 16, sixteen bolt holes 18, and several water passages 20 of varied sizes.

The line view of gasket 14 shows openings that are complementary to openings in the cylinder block view 12 (and cylinder head view 10). Specifically, gasket 14 contains cylinder openings 24 and bolt openings 26. However, the coolant passage holes 28 in the gasket are by design much smaller than the water passage holes 20 in block 12. This gasket design is intended to restrict the flow of coolant between block 12 and head 10. Of course, the actual gasket is a laminated structure typically comprising a steel sheet or foil with a compressible, somewhat porous graphite composite on at least one side and an outer layer on each side of plastic foil.

The line drawing of head 10 is an outline or silhouette of the lower surface of a cylinder head adapted to be bolted to the deck of cylinder block 12 and gasket 14. The full cylinder head is not shown because it would complicate the illustration of the abutting surfaces of the head 10, gasket 14 and block 12. The line drawing of head 10 shows the locations of combustion chambers 30, bolt holes 32 and water passages 34.

As is well known in the operation of a liquid-cooled, internal combustion engine, coolant is pumped under pressure in jackets (not shown in the line drawing of FIG. 2) around each cylinder and around the combustion chambers and exhaust ports (neither shown in FIG. 2) in the head. Similarly, lubricating oil is circulated around the crank shaft and pistons in the block and around the camshaft(s) and valvetrain in the head. In a V-type block, there is also a block valley (not shown) next to edge 22 of the deck portion of block 12. Thus, the coolant and oil circulate in close proximity to each other but must be kept apart for satisfactory engine durability.

Figure 3A:
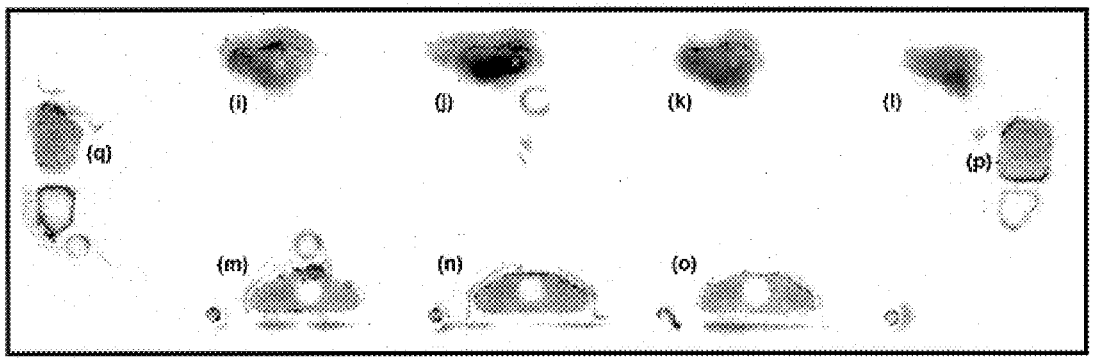
FIGS. 3A and 3B are digitized plots of autoradiographic images of the block side (3A) and head side (3B) of a gasket following Test A, in which a known coolant leakage condition pre-existed.
Figure 3B:
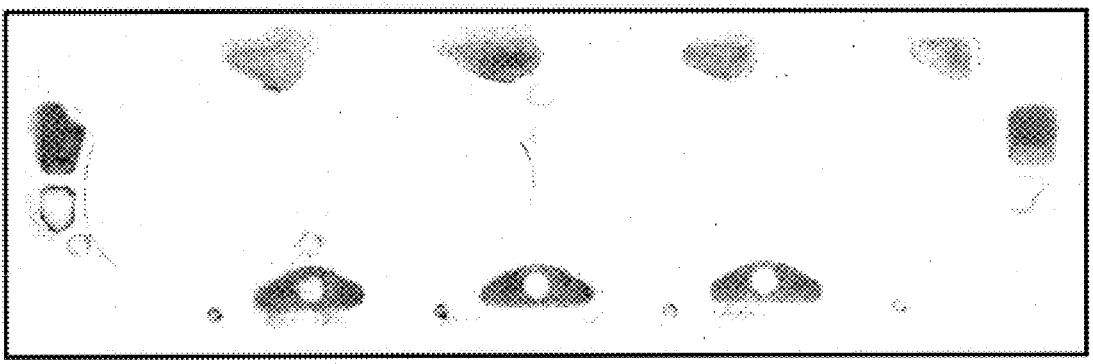

FIG. 3 shows autoradiograms obtained from the block and head surfaces of the water-rinsed head gasket from the right cylinder bank following Test A. The darkness of exposure at a given location is proportional to the amount of remaining radiotracer present. Images of a very similar nature were obtained from the gasket on the left bank.

The gasket should be impregnated first with the tracer wherever there is direct contact between the gasket and an open coolant passage. This is indeed the case for the four areas on the inboard side of each gasket surface (i, j, k, l) and the three areas on the outboard side of each surface (m, n, o). A rectangular image on the right side (p) and an irregular shaped image on the left side (q) indicate passages in the head and block that are sealed off by the gasket.

The images of the block and head side are somewhat different because the block side has a composite graphite layer whereas the head side has only a thin plastic coating on the steel substrate. The block side shows a more diffuse image because of the finite depth of the composite material. The outboard images on the block side (m, n, o) also show a border around them with no apparent radioactivity. This gap is due to the presence of a thin plastic-coated steel layer in some areas on that side of the gasket, which also serves as a radiation absorber. The head side of the gasket shows indications of the coolant pooled in the dimpled indentations from the steel substrate.

The gasket images also reveal that there are many locations where the tracer extends well beyond the area of direct contact with engine coolant. In particular, the regions around three of the inboard areas (i, j, k) show that tagged coolant extends all the way to the end of the gasket. (See FIG. 2 for line drawing of head gasket 14.) This is direct evidence of coolant leakage to the inboard side of the head/block interface (next to the block valley), and hence directly into the oiling system. It is also evident in FIG. 3B that these inboard areas are also leaking into the oiling system from the head side of the gasket interface.

Figure 4A:
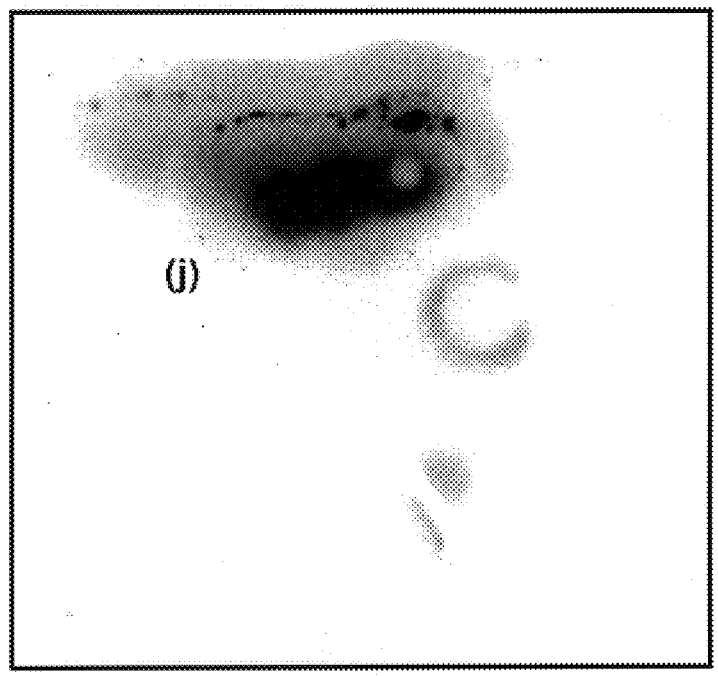
FIGS. 4A and 4B are enlarged areas from the FIGS. 3A and 3B images of the block side (4A) and head side (4B) of the gasket following Test A.
Figure 4B:
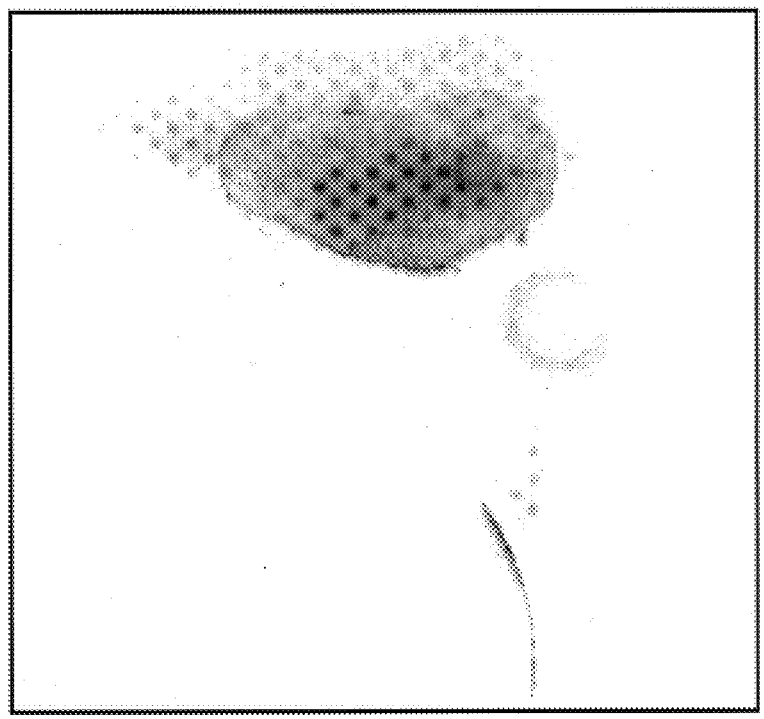

Shown in FIG. 4 is an enlarged view of the inboard area between the second and third cylinders of the right cylinder bank for both sides of the gasket. The outline of the coolant passage through the block (j) and head can be seen. However, the extension of coolant beyond the passage to the end of the gasket is evident from the dark image following the contour of the gasket. Some coolant has leaked into the headbolt holes and some tracer is deposited at the edge of the combustion chamber.

The general conclusion that can be drawn from these images is that there are multiple leakage pathways for coolant into the oil. Primarily leakage occurs at the inboard side of the gasket and is greatest adjacent to the interior cylinders. Leakage occurs on both the block and head sides of the gasket, and the left and right cylinder banks behave similarly.

Figure 5:
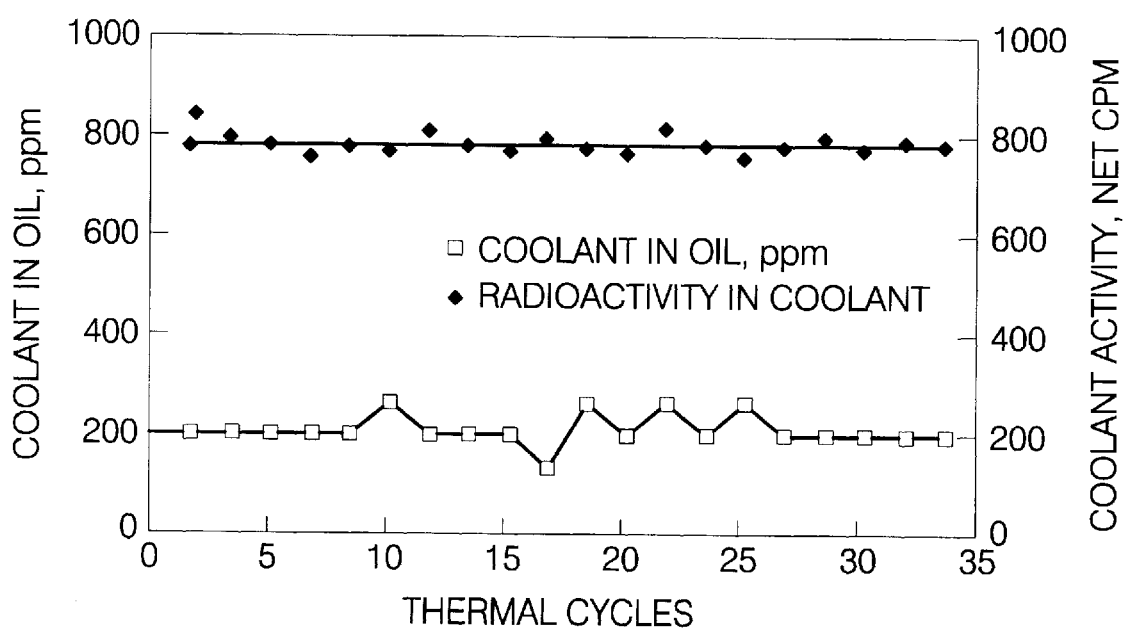
FIG. 5 is a graph of potential coolant contamination in oil as a function of engine thermal cycle number in Test B, in which a known coolant leakage condition did not pre-exist. The absence of coolant contamination was determined from the absence of radiotracer levels in the oil. Also shown for reference is the radioactivity content in the coolant during the same operating period.

Results of oil and coolant radioactivity measurements taken during Test B are presented in FIG. 5. The plot is similar to that of Test A for the radiotracer activity in the coolant, but there is no evidence of coolant leakage into the oil, even after 250 cycles with tracer in the coolant. The major difference between these studies is that prior to Test A, the engine had been run on a regular deep thermal cycle test for 1200 cycles and had a known coolant leakage problem. Apparently, the modified thermal cycling performed on the research dynamometer was not sufficient, or not enough cycles were performed, to cause the onset of coolant leakage into the oil. Because of the higher levels of radiotracer employed and longer sample counting times, the detection level for coolant in oil during Test B was 50 ppm at 95% confidence.

Autoradiograms of the block side of the original and new gaskets in this Test B are not shown because, in contrast to Test A, there was no leakage of coolant into the oil. The autoradiograms showed that the coolant impregnated the vast majority of the graphite composite material, both for the original and new gaskets. This different result is likely due to the fact that only 32 cycles were run in Test A with radiotracer in the coolant, whereas 240 cycles were run in Test B with the radiotracer.

It appeared that the coolant in the original gasket was on the verge of reaching the oiling system. This was not the case for the new gasket, where no tracer was found on the inboard side of the coolant passages.

Thus, it has been demonstrated that the use of a $^{86}$Rb salt in the coolant system permits easy detection of coolant leak paths in engines as well as a low cost evaluation of engine design as regards possible coolant leakage.

While this invention has been described in terms of some specific embodiments, it will be appreciated that other forms can readily be adapted by one skilled in the art. Accordingly, the scope of this invention is to be considered limited only by the following claims.

What is claimed is:

1. A method of detecting leakage of a coolant containing glycol and water in an internal combustion engine comprising coolant circulation passages and lubricating oil circulation passages, said method comprising dissolving a compound comprising $^{86}$Rb in said coolant, said $^{86}$Rb producing beta emissions and gamma rays, operating said engine and circulating said coolant and said oil in their respective said passages, and thereafter analyzing at least one of said oil or a suspected coolant leakage site for said emissions or rays.

2. A method of detecting leakage of a coolant containing glycol and water in an internal combustion engine comprising a cylinder block, a cylinder head and a gasket interposed in sealing relationship between them, and coolant circulation passages and oil lubrication passages in said block and head, said method comprising dissolving a salt comprising $^{86}$Rb in said coolant, said rubidium producing β-emissions and γ rays, operating said engine and circulating said coolant and said oil in their respective said passages, and thereafter analyzing at least one of said oil or a suspected coolant leakage site for said emissions or rays.

3. A method of detecting leakage of a coolant containing glycol and water in an internal combustion engine comprising a cylinder block, a cylinder head and a gasket interposed in sealing relationship between them, and coolant circulation passages and oil lubrication passages in said blocks and heads, said method comprising dissolving a salt comprising $^{86}$Rb in said coolant, said rubidium producing β-emissions and γ rays, operating said engine and circulating said coolant and said oil in their respective said passages, and thereafter analyzing at least one of said oil or said gasket for said emissions or rays.

4. A method as recited in claim 3 in which said engine is operated under conditions at which said coolant is repeatedly thermally cycled between high and low operating temperatures and the analysis of said oil or gasket is conducted after engine operation is stopped.

5. A method as recited in claim 1 or 2 in which said oil is examined for the presence of said coolant therein by examining said oil for gamma ray radiation emanating from said $^{86}$Rb.

6. A method as recited in claim 1 or 2 in which said gasket is examined for the presence of said coolant therein by examining said gasket for beta radiation emanating from said $^{86}$Rb.

7. A method as recited in claim 3 or 4 in which said oil is examined for the presence of said coolant therein by examining said oil for gamma ray radiation emanating from said $^{86}$Rb.

8. A method as recited in claim 3 or 4 in which said gasket is examined for the presence of said coolant therein by examining said gasket for beta radiation emanating from said $^{86}$Rb.

* * * * *